US011122056B2

United States Patent
Sundar et al.

(10) Patent No.: US 11,122,056 B2
(45) Date of Patent: Sep. 14, 2021

(54) SYSTEMS AND METHODS FOR BINDING AUTHORIZATION TO A PROXY USING A GET/AUTHORIZE URL THROUGH A NATIVE APPLICATION

(71) Applicant: JPMORGAN CHASE BANK, N.A., New York, NY (US)

(72) Inventors: Gayathri Sundar, Irving, TX (US); Howard Spector, Woolwich, NJ (US); Rajitha Dissanayake, Frisco, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 205 days.

(21) Appl. No.: 16/545,153

(22) Filed: Aug. 20, 2019

(65) Prior Publication Data

US 2020/0059477 A1    Feb. 20, 2020

Related U.S. Application Data

(60) Provisional application No. 62/719,947, filed on Aug. 20, 2018.

(51) Int. Cl.
*G06F 15/16* (2006.01)
*H04L 29/06* (2006.01)
(Continued)

(52) U.S. Cl.
CPC ........ *H04L 63/108* (2013.01); *H04L 63/0281* (2013.01); *H04L 63/083* (2013.01);
(Continued)

(58) Field of Classification Search
CPC . H04L 63/108; H04L 63/0281; H04L 63/083; H04L 67/20; H04L 67/2814; H04L 67/34
(Continued)

(56) References Cited

U.S. PATENT DOCUMENTS 8,073,428 B2 * 12/2011 Khetawat .............. H04W 16/16
455/411
9,225,711 B1    12/2015 Sorensen
(Continued)

OTHER PUBLICATIONS

International Search Report, dated Oct. 24, 2019, from corresponding International Application No. PCT/US2019/047161.
(Continued)

*Primary Examiner* — Moustafa M Meky
(74) *Attorney, Agent, or Firm* — Greenberg Traurig LLP

(57) ABSTRACT

In one embodiment, in an information processing apparatus comprising at least one computer processor, a method for binding a GET/AUTHORIZE URL to a proxy through a native application may include: (1) receiving, at a native application executed by an electronic device, an applink call or a universal link call from a third-party application executed by the electronic device, the redirect comprising at least one parameter; (2) providing a Get/Authorize call with the at least one parameter to an API gateway; (3) receiving a 302 redirect from the API gateway; (4) providing authentication information to an authorization platform; (5) receiving an authorization code from the authorization platform; and (6) redirecting the third-party application with the redirect URL and authorization code.

16 Claims, 3 Drawing Sheets

(51) Int. Cl.
  *H04L 29/08*    (2006.01)
  *H04W 12/30*    (2021.01)
(52) U.S. Cl.
  CPC .......... *H04L 67/20* (2013.01); *H04L 67/2814* (2013.01); *H04L 67/34* (2013.01); *H04W 12/35* (2021.01)
(58) Field of Classification Search
  USPC ........................................................ 709/201
  See application file for complete search history.

(56) References Cited

U.S. PATENT DOCUMENTS

| | | | |
|---|---|---|---|
| 2007/0289005 | A1 | 12/2007 | Kumar et al. |
| 2011/0276465 | A1* | 11/2011 | MacKinnon ......... G06Q 20/407 705/38 |
| 2014/0033279 | A1 | 1/2014 | Nimashakavi et al. |
| 2014/0143836 | A1 | 5/2014 | Fletcher et al. |
| 2015/0286737 | A1 | 10/2015 | Cattone et al. |
| 2017/0024717 | A1* | 1/2017 | Istrati ...................... H04L 67/16 |
| 2017/0111351 | A1 | 4/2017 | Grajek et al. |
| 2018/0075231 | A1 | 3/2018 | Subramanian et al. |
| 2018/0103109 | A1 | 4/2018 | Jaladi et al. |

OTHER PUBLICATIONS

Written Opinion of the International Searching Authority, dated Oct. 24, 2019, from corresponding International Application No. PCT/US2019/047161.

* cited by examiner

SYSTEMS AND METHODS FOR BINDING AUTHORIZATION TO A PROXY USING A GET/AUTHORIZE URL THROUGH A NATIVE APPLICATION

RELATED APPLICATIONS

This application claims the benefit of U.S. Provisional Patent Application Ser. No. 62/719,947, filed Aug. 20, 2018, the disclosure of which is hereby incorporated by reference in its entirety.

BACKGROUND OF THE INVENTION

1. Field of the Invention

Embodiments are generally directed to systems and methods for binding authorization to a proxy using a get/authorize URL through a native application.

2. Description of the Related Art

On mobile devices, there is a need to redirect a user to a mobile application (e.g., the Chase Pay application) if installed from context of third party applications trying to use Native OAUTH 2.0 supported by an API gateway (e.g., the Chase API Gateway). Currently, the third-party client requests the GET/Authorize, and the authorization response from API Gateway lands on the third-party app that does a 302 redirect to the mobile application which is registered as universal link.

SUMMARY OF THE INVENTION

Systems and methods for binding authorization to a proxy using a get/authorize URL through a native application are disclosed.

In one embodiment, in an information processing apparatus comprising at least one computer processor, a method for binding a GET/AUTHORIZE URL to a proxy through a native application may include: (1) receiving, at a native application executed by an electronic device, an applink call or a universal link call from a third-party application executed by the electronic device, the redirect comprising at least one parameter; (2) providing a Get/Authorize call with the at least one parameter to an API gateway; (3) receiving a 302 redirect from the API gateway; (4) providing authentication information to an authorization platform; (5) receiving an authorization code from the authorization platform; and (6) redirecting the third-party application with the redirect URL and authorization code.

In one embodiment, a first parameter may include a redirect URL, and a second parameter may include a response type.

In one embodiment, the applink call or the universal link call may redirect to a website associated with a provider of the native application, may redirect to download the native application, etc.

In one embodiment, the method may further include receiving consent from the user to share access to a protected service with the third party; and providing the consent to the authorization platform.

In one embodiment, the authorization code may be time-limited.

According to another embodiment, a system for binding a GET/AUTHORIZE URL to a proxy through a native application may include an electronic device executing a native application and a third-party application; an API gateway; and an authorization platform. The native application may receive an applink call or a universal link call comprising at least one parameter from the third-party application and provide the API gateway with a Get/Authorize call with the at least one parameter. The API gateway may return a 302 redirect to the native application. The native application may provide authentication information to the authorization platform, and authenticate a user of the native application. The authorization platform may provide an authorization code to the native application. The native application may redirect the third-party application with the redirect URL and authorization code.

In one embodiment, wherein the authentication information may include a username and password.

In one embodiment, the authorization platform may request the authentication code from the API gateway.

In one embodiment, the authentication code may be time-limited.

In one embodiment, the authorization code may be returned to the native application using the redirect URL.

In one embodiment, the third-party application may exchange the authorization code for an access token.

In one embodiment, the third-party application may exchange the authorization token for the access token with the API gateway via a third-party backend.

In one embodiment, the third-party application may use the application token to access a protected service, wherein the access token is a proxy for a user login.

In one embodiment, the access token may include a Siteminder session.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are generally directed to systems and methods for binding authorization to a proxy using a get/authorize URL through a native application.

Embodiments use dependency on a third party to redirect to a native application, such as an application provided by the host financial institution. A GET/Authorize URL may not be validated on client side, but may be checked only on the API Gateway side. Thus, malformed requests or requests that does not meet some criteria from reaching API Gateway are not blocked.

In embodiments, the original GET/Authorize URL may be used as an APPLink for Android mobile applications, or as a universal link for iOS mobile applications. In embodiments, the GET/Authorize call, although initiated by the client application, is routed to a mobile application on the electronic device by the underlying operating system. This request does not go out directly from third party application.

The mobile application may receive the GET/Authorize URL, intent, or other form of notification, and then may transition to the foreground. The mobile application may validate the correctness of this URL, and then make a call to an API Gateway. Thus, the mobile application acts as a transparent proxy.

In one embodiment, the mobile application may perform some or all of the following checks: (1) check for client impersonation; (2) checks for fake external user agents; (3) check for malicious external agents; (4) checks for cross-site request forgery (CSRF) protections; and (5) checks for authorization server mix-up.

The response from the API Gateway may reach the mobile application directly rather than through the third party, and additional processing may be performed. Thus, the third party is not needed to make a redirect call to the mobile application's backend. This avoids one "back and forth" from user experience perspective.

Figure 1:
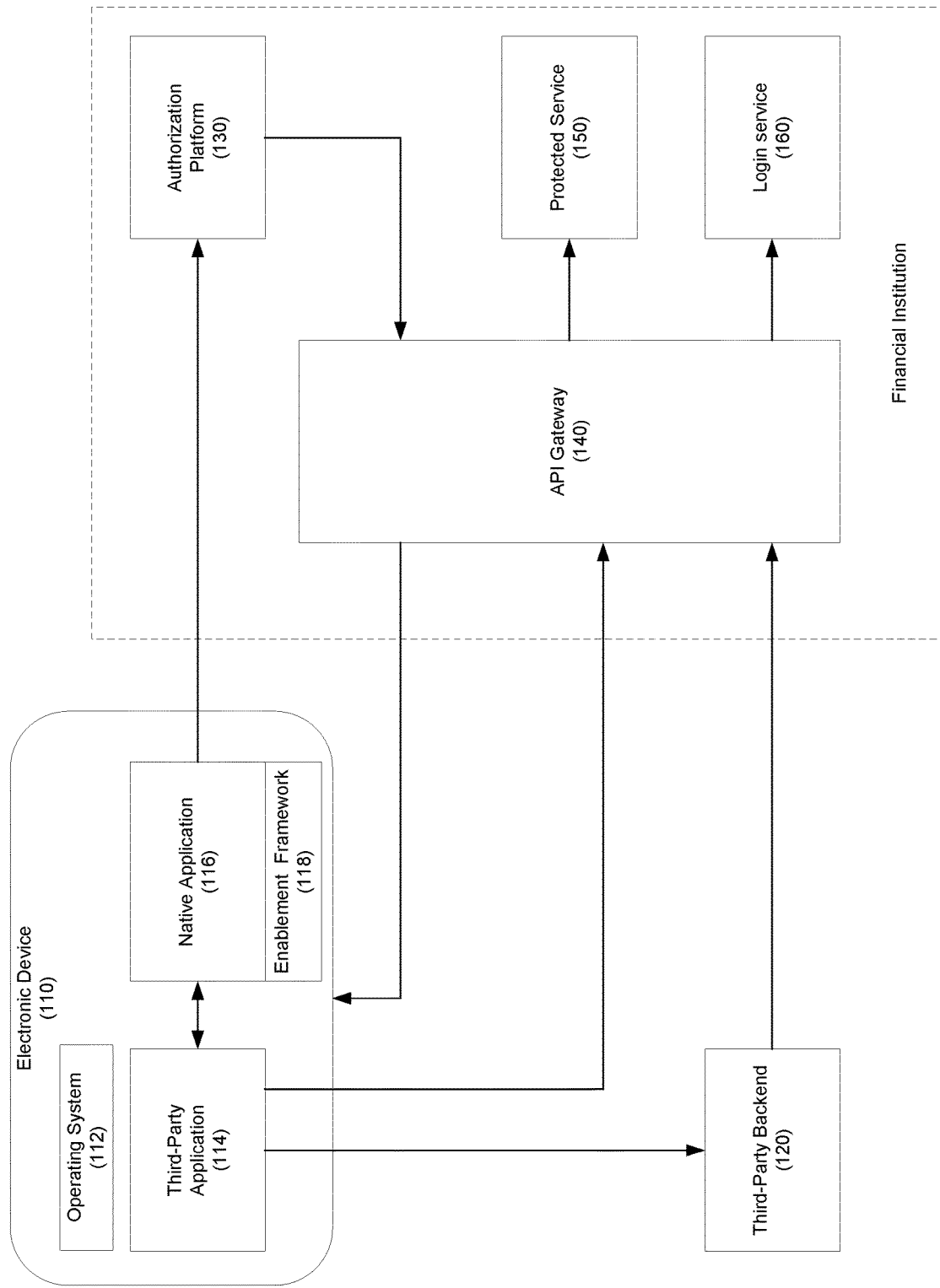
FIG. 1 depicts a system for binding authorization to a proxy using a get/authorize URL through a native application according to one embodiment.

Referring to FIG. 1, a system for binding authorization to a proxy using a get/authorize URL through a native application is disclosed according to one embodiment. System 100 may include electronic device 110, which may be any suitable electronic device that may execute computer programs or "apps," and has network connectivity. Examples include computers, smart phones, smart jewelry (e.g., smart watches), Internet of Things ("IoT") appliances, etc.

Electronic device 110 may execute one or more applications, such as third-party application 114 and native application 116. An example of native application 116 is an iOS, Android, or browser-based application provided by a host financial institution.

Third-party application 114 may be an application provided by, for example, a merchant.

Electronic device 110 may further include operating system ("OS") 112, such as the iOS™ operating system, the Android™ operating system, etc. It may further include enablement framework 118. Enablement framework 118 may include a common library or code that may be shared across applications.

System 100 may further include third-party backend 120, which may communicate with third-party application 114.

Electronic device 110 and third-party backend 120 may communicate with API gateway 140, which may be provided by a financial institution. API gateway 140 may communicate with protected service 150. Protected services 150 may include services that require some form of authentication to be accessed. For example, protected services 150 may be required to know who is calling, such as the end user or another system. In one embodiment, the caller (e.g., the end user or the other system) may be required to express its identify to make the call.

API gateway may further interact with login service 160, such as Siteminder.

The financial institution may further provide authorization platform 130, which may interact with API gateway 140 and native application 116. Authorization platform 130 may provide transaction authorization services for the financial institution. In one embodiment, authorization platform may authenticate a user based on username and password. It may further use additional authentication, such as out-of-band authentication.

In one embodiment, authorization platform 130, API gateway 140, protected service 150, and login service 160 may be provided by an entity, such as a financial institution.

In one embodiment, native application 116 may be provided by, or otherwise associated with, the entity.

Figure 2:
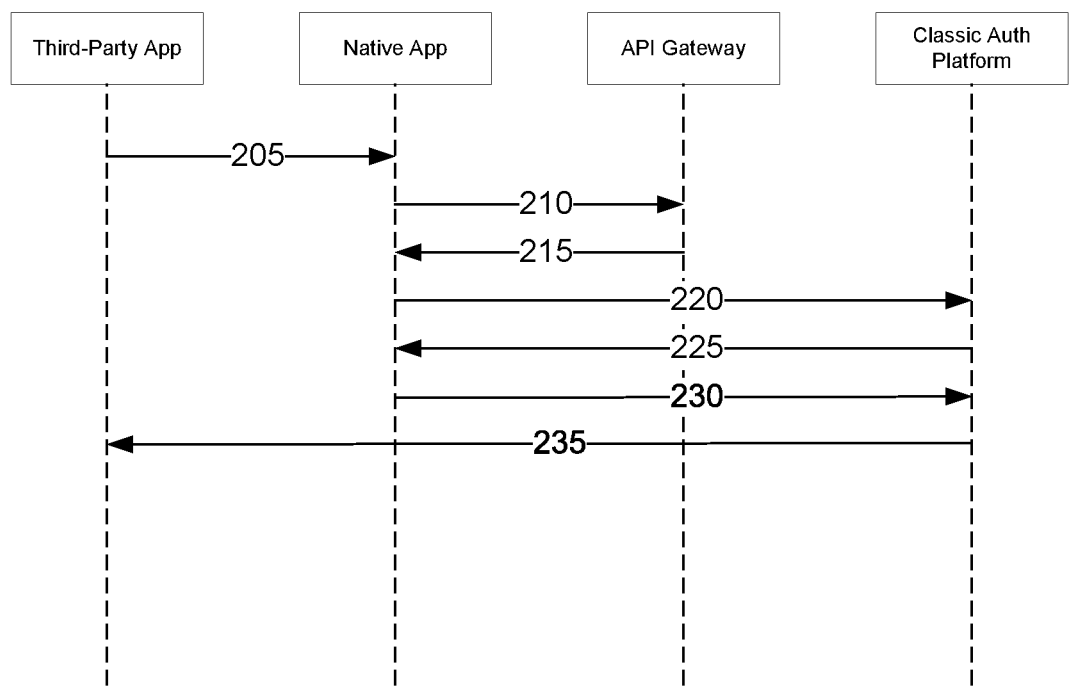
FIG. 2 depicts a method for binding authorization to a proxy using a get/authorize URL through a native application according to one embodiment.

Referring to FIG. 2, a process flow is provided according to one embodiment.

In step 205, a third-party application, such as that for a merchant, may call a universal link, and the operating system redirects the link to a native application for the financial institution if present on the mobile device. For example, the Get/Authorized may include some or all of the following parameters (note that the names of the parameters are exemplary only):

client_id={third-partyId} (i.e., the client identifier of the third party as provisioned in the API Gateway);

response_type="code" (e.g., the code is the HTTP response code as defined by the HTTP RFC, they may be 2XX, 3XX and 4XX);

redirect_uri (i.e., the redirect URL for the third party to which the user interface will redirect once the authorization code is received);

scope="mobile application" (e.g., "ChasePay" or another mobile application);

state=123xyz (this may be an arbitrary value used to prevent cross-site request forgery);

third-party_user_id (this may be an optional customer identifier that may be provided by the third party, such as the customer's email, name, phone number digits, etc. This may further include metadata to specify the type of identifier (e.g., a name, phone number, email address, etc.);

third-party_customer_id (this may be the customer identifier used by the customer to log into the third-party application or website. In one embodiment, this may be a tokenized value to maintain customer security);

third-party_name (i.e., the name of the third-party);

mobile_app_third-party_id (i.e., the third-party identifier used by the native application);

language (this may be an optional identifier for the language used).

In one embodiment, if the native application is not present on the electronic device, the user may be redirected to a website to login, or may be prompted to download the native application.

In step 210, the native application calls the Get/Authorize to the API gateway with the parameters it received in step 205.

In step 215, if the response to the Get/Authorize is successful, the API gateway may return a 302 redirect to the native application.

In step 220, the native application may present a login screen and trigger an enablement flow with an authorization platform.

In step 225, the authorization platform may return an authorization code to the native application, and in step 230, the native application may redirect the third-party application with the redirect URL and authorization code per oAUTH spec for success and failure scenarios.

In step 235, one or more tokens may be returned to the third-party application that may be used to retrieve access tokens.

According to another embodiment, methods for proxying web requests using a custom URL or deep links are disclosed. On a mobile device, custom URL schemes allow an application (i.e., a linking app) to link into a specific area of another application (i.e., a linked app). This linking into a specific area may be broadly referred to as "Deep Linking" and the linking app may pass data into the linked app through this process. The passed URL and data may be consumed by the linked app, or it may act as a proxy that may provide added services to the request, and pass the request and services to its intended destination.

Although deep linking is a powerful and easy method through which apps can communicate, because the links specified by the linked app are not verified, any application could register to handle the links and start intercepting the requests coining in from the linking application.

To address this issue, both Android and iOS have introduced a secure version of deep linking called "App links" and "Universal links," respectively. When setting up App links or Universal links, a configuration file may be hosted on the server, pointed to by the link URL. This file contains information used by the device OS, upon app installation or link invocation, to verify the app that is claiming to be linked by the URL and thus ensures and certifies that the app has a valid claim to handle the link.

According to another embodiment, transparent proxying may be used. A transparent proxy is a proxy that intercepts network requests at the network layer. Because the interception occurs at the network layer, no client configuration is required to intercept the network requests. A key property of a transparent proxy is that it does not modify the intercepted request, but simply relays the request through to the intended destination, untouched.

Figure 3:
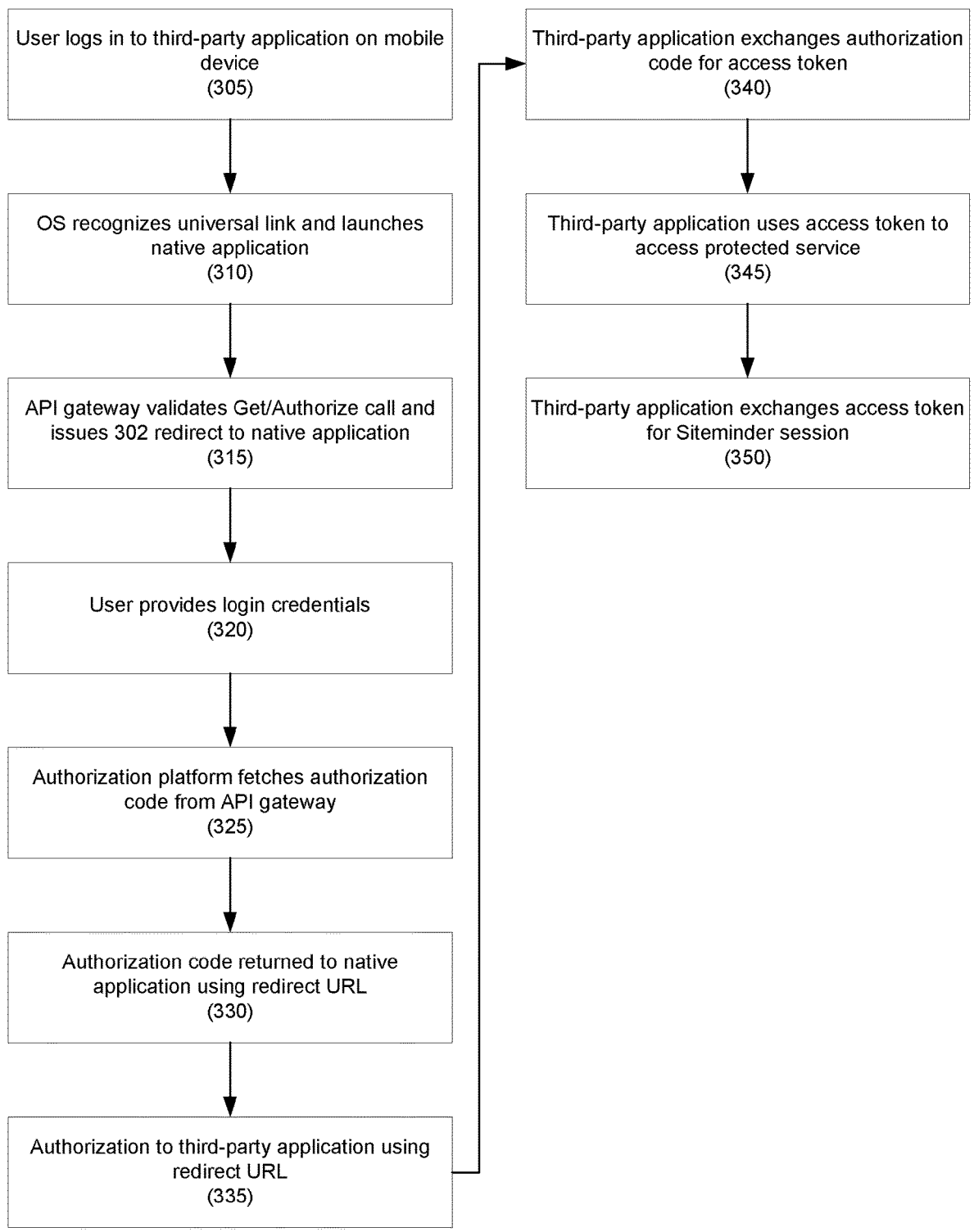
FIG. 3 depicts a use journey from logging on to granting a third-party access according to one embodiment.

Referring to FIG. 3, a process flow is provided according to another embodiment.

In step 305, a user may login to an application, such as a third-party application, or a web browser on a mobile device. The user may be provided a deep link to a native application for a financial institution that may invoke the Get/Authorize call that may act as a deep link.

In step 310, using universal links for iOS, and AppLinks on Android, and a Javascript or a href tag associated with window.open if using a browser, the underlying platform may recognize the universal link and launch a native application that may proxy this request to API Gateway after doing necessary validations to the correctness of this URL.

In step 315, the API Gateway may validate the GET/Authorize call and issue a 302 redirect to the native application. The user may be required to login to the native application.

In step 320, the user may provide login credentials to start the OAUTH consent flow. The credentials may be provided to an authorization platform. The user may also be required to consent to sharing access with a third party.

In step 325, the authorization platform may fetch an authorization code from the API gateway. The authorization code may be a short-lived authorization code.

In step 330, the authorization code may be returned to the native application using the using a redirect URL from the API Gateway.

In step 335, the authorization code may be sent to the third-party application using same redirect URL. For example, the native application may provide the authorization code via the 302 local redirect.

In step 340, the third-party application may exchange the authorization code for an access token from the API gateway via a third-party backend. In one embodiment, the authorization code may be shared with the third-party application, then the third party must send this code through their backend system to the host financial institution. This system to system connection is secured separately and adds additional security to the interaction. Once received, the financial institution may validate the code; if the code is still valid (e.g., has not expired), the financial institution will issue an access token.

In step 345, the third-party application may use the access token to access the protected service. In one embodiment, the access token in OAUTH is a proxy for the user logging in themselves, so any system that has proven it can obtain an access token can then make calls to the backend as if they were the customer.

Alternatively, in step 350, the third-party application may exchange the authorization code for a Siteminder session instead of an access/refresh code. In one embodiment, this may be done by proxy via the native application. In another embodiment, the third-party backend may provide this to the API Gateway, which may use authorization to interact with Siteminder. For example, the authorization code may be swapped for a native Siteminder access token instead of an OATH one as described above.

Technical advantages may include some or all of the following: (1) the validation of the GET/Authorize URL thereby preventing abnormal requests; (2) the native app is more secure than a browser instance on mobile channel (e.g., the native app has checks, such as rooting, jailbreaking, malware, etc. which browser does not, the native app has certificate pinning that no phishing site can be connected which is not really true with safari/chrome); (3) ATS (Application Transport security) standards have been applied for the TLS session on mobile channels, whereas browsers are still evolving on this front with many TLS loopholes; (4) with universal links and App links, the transition from third party app to native is a smooth transition and no spurious or rogue app can claim to take a registered domain, as it is managed by Apple/Google servers that perform real-time checks of this URL before launching app.

Exemplary implementations are provided in the attached Appendix.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for binding a GET/AUTHORIZE URL to a proxy through a native application, comprising:
   in an information processing apparatus comprising at least one computer processor:
   receiving, at a native application executed by an electronic device, an applink call or a universal link call from a third-party application executed by the electronic device, the redirect comprising at least one parameter;
   providing a Get/Authorize call with the at least one parameter to an API gateway;
   receiving a 302 redirect from the API gateway;
   providing authentication information to an authorization platform;
   receiving an authorization code from the authorization platform; and
   redirecting the third-party application with the redirect URL and authorization code.

2. The method of claim 1, wherein a first parameter comprises a redirect URL.

3. The method of the claim 2, wherein a second parameter comprises a response type.

4. The method of claim 1, wherein the applink call or the universal link call redirects to a website associated with a provider of the native application.

5. The method of claim 1, wherein the applink call or the universal link call redirects to download the native application.

6. The method of claim 1, further comprising:
   receiving consent from the user to share access to a protected service with the third party; and
   providing the consent to the authorization platform.

7. The method of claim 1, wherein the authorization code is time-limited.

8. A system for binding a GET/AUTHORIZE URL to a proxy through a native application, comprising:
   an electronic device executing a native application and a third-party application;
   an API gateway; and
   an authorization platform;
   wherein:
   the native application receives an applink call or a universal link call comprising at least one parameter from the third-party application;
   the native application provides the API gateway with a Get/Authorize call with the at least one parameter;
   the API gateway returns a 302 redirect to the native application;
   the native application provides authentication information to the authorization platform;
   the native application authenticates a user of the native application;
   the authorization platform provides an authorization code to the native application; and
   the native application redirects the third-party application with the redirect URL and authorization code.

9. The system of claim 8, wherein the authentication information comprises a username and password.

10. The system of claim 8, wherein the authorization platform requests the authentication code from the API gateway.

11. The system of claim 8, wherein the authentication code is time-limited.

12. The system of claim 8, wherein the authorization code is returned to the native application using the redirect URL.

13. The system of claim 8, wherein the third-party application exchanges the authorization code for an access token.

14. The system of claim 13, wherein the third-party application exchanges the authorization token for the access token with the API gateway via a third-party backend.

15. The system of claim 8, wherein the third-party application uses the application token to access a protected service, wherein the access token is a proxy for a user login.

16. The system of claim 8, wherein the access token comprises a Siteminder session.

\* \* \* \* \*